US008236098B2

(12) United States Patent
Ramme et al.

(10) Patent No.: US 8,236,098 B2
(45) Date of Patent: Aug. 7, 2012

(54) SETTABLE BUILDING MATERIAL COMPOSITION INCLUDING LANDFILL LEACHATE

(75) Inventors: Bruce W. Ramme, Okauchee, WI (US); Timothy C. Muehlfeld, Wauwatosa, WI (US)

(73) Assignee: Wisconsin Electric Power Company, Milwaukee, WI (US)

( * ) Notice: Subject to any disclaimer, the term of this patent is extended or adjusted under 35 U.S.C. 154(b) by 86 days.

(21) Appl. No.: 12/730,537

(22) Filed: Mar. 24, 2010

(65) Prior Publication Data

US 2011/0232532 A1 Sep. 29, 2011

(51) Int. Cl.

*C04B 14/40* (2006.01)
*C04B 7/00* (2006.01)
*C04B 14/00* (2006.01)
*C04B 18/06* (2006.01)

(52) U.S. Cl. ........ 106/624; 106/700; 106/703; 106/705; 106/709

(58) Field of Classification Search .................. 106/697, 106/705, 628, 606, 608, 709, 717, 624, 700, 106/703

See application file for complete search history.

(56) References Cited

U.S. PATENT DOCUMENTS 4,230,568 A 10/1980 Chappell
4,375,986 A 3/1983 Pichat
4,407,677 A 10/1983 Wills, Jr.
4,917,733 A * 4/1990 Hansen ......................... 106/707
5,374,309 A 12/1994 Piniecki
5,405,441 A 4/1995 Riddle
5,435,843 A 7/1995 Roy et al.
5,582,573 A 12/1996 Weszely
5,584,895 A 12/1996 Seike et al.
5,601,643 A 2/1997 Silverstrim et al.
5,759,259 A * 6/1998 Sychra et al. ................. 106/659
5,810,922 A * 9/1998 Okamoto et al. ............. 106/714
5,931,772 A 8/1999 Kirkpatrick et al.
6,461,424 B1 10/2002 Ramme et al.
6,572,698 B1 6/2003 Ko
6,776,838 B2 8/2004 Hemmings et al.
7,267,720 B2 9/2007 Sadikovic
7,284,930 B2 10/2007 Shi et al.
7,297,664 B2 11/2007 Santra et al.
7,332,026 B2 2/2008 Fyten et al.
2002/0162484 A1* 11/2002 Ramme et al. ................ 106/705
2007/0056361 A1* 3/2007 Imhoff et al. ..................... 73/73
2000/9021784 9/2009 Ordonez et al.

OTHER PUBLICATIONS

Dydo, Piotr; Turek, Marian; Ciba, Jerzy; Trojanowska, Jolanta; Kluczka, Joanna. "Boron Removal from Landfill Leachate by Means of Nanofiltration and Reverse Osmosis". 2005 [Retrieved on Sep. 21, 2011].*
BASF MB-AE 90 Air-Entraining Admixture, 2007.

* cited by examiner

*Primary Examiner* — Anthony J Green
*Assistant Examiner* — Karam Hijji
(74) *Attorney, Agent, or Firm* — Quarles & Brady LLP

(57) ABSTRACT

A composition capable of setting to produce a building material is disclosed. The composition can include from 1% to 30% by weight of an activator, from 1% to 55% by weight of a pozzolan, such as fly ash; from 40% to 90% by weight of an aggregate; and liquid landfill leachate in a sufficient amount such that the composition sets to a building material having a compressive strength of at least 2 MPa, wherein all weight percentages are percent by weight of the total composition. The liquid landfill leachate replaces all or part of the tap water in a conventional composition for forming a building material. The liquid landfill leachate can be recovered after a liquid (typically water) percolates through a landfill and contacts at least one landfilled coal combustion product selected from fly ash, bottom ash, boiler slag, and flue gas desulfurization material. The building material can be a concrete, or a masonry unit.

28 Claims, No Drawings

SETTABLE BUILDING MATERIAL COMPOSITION INCLUDING LANDFILL LEACHATE

CROSS-REFERENCES TO RELATED APPLICATIONS

Not Applicable.

STATEMENT REGARDING FEDERALLY SPONSORED RESEARCH

Not Applicable.

BACKGROUND OF THE INVENTION

1. Field of the Invention

This invention relates to a building material formed from a settable composition including landfill leachate.

2. Description of the Related Art

Coal combustion products (CCP) are the byproducts generated from burning coal in coal-fueled power plants. These CCP include fly ash, bottom ash, boiler slag, and flue gas desulfurization materials. Today, most coal combustion products are stored in monofill landfills that are lined, eventually covered, and constructed with leachate collection systems. Large volumes of CCP are landfilled annually because the supply of material exceeds demand in construction and miscellaneous other applications. There are also situations where the consistency of chemical or physical characteristics do not align with specification requirements for projects resulting in disposal. The American Coal Ash Association reported that over 131 million tons of CCP were produced in the USA during 2007. Approximately 40% of the CCP produced annually are beneficially used which leaves 60% destined for disposal.

One of the most proven and highly valued uses for CCPs are in the cement and concrete industry. For example, fly ash (as described in ASTM C 618) can be used as a cementitious and/or pozzolanic material (typically with Portland cement) in the production of concrete. Bottom ash is sometimes also used as an aggregate in concrete. Fly ash and bottom ash are commonly used as raw-feed materials in cement manufacturing as alternatives to conventional clay, shale or other mined minerals. Power plant flue gas desulfurization gypsum or mined gypsum are also used in cement manufacturing and interground with clinker as an important additive for helping to control the time-of-set of Portland cement products.

Still, significant amounts of coal combustion products are disposed in landfills. As water (from material stabilization, precipitation, dust control and compaction) percolates through the coal combustion products in a landfill, the water picks up chemicals and minerals. This water with chemicals and minerals is called leachate. Landfill leachate commonly has to be trucked or piped to a wastewater facility for treatment at a cost.

Fresh water is typically used for concrete and related building materials production. However, fresh water is a limited and valuable natural resource.

Thus, there is a need for a safe and economically advantageous means for avoiding wastewater treatment of landfill leachate. Also, there is a need for a means for conserving fresh water that is normally used in the production of building materials such as concrete.

SUMMARY OF THE INVENTION

The foregoing needs are met by a composition according to the invention that is capable of setting to produce a building material such as concrete or the like. The composition comprises landfill leachate that includes water and some of the chemicals and/or minerals present in landfilled materials. In the case of monofill coal combustion products landfills, the leachate typically appears as "clear" ash-contact water that is enriched in coal combustion products constituent elements and minerals such as calcium, sodium, potassium, boron, magnesium, sulfate, chloride, aluminum, silica, and other trace elements.

Many of the minerals found in CCP landfill leachate are helpful as activators in cementitious reactions during concrete production. Portland cement, slag, and Class C fly ash all bring lime (CaO) to concrete mixtures as one of the primary cementing compounds in concrete. Class C and Class F fly ashes are used as pozzolans where the $SiO_2$ in the fly ash combined with the excess lime provided by Portland cement produce additional cementitious binder material thus increasing concrete strength and durability.

In an exemplary composition according to the invention, leachate and ash content water collected from coal combustion products monofill landfills are used as mixing water for concrete production with beneficial effects of increased compressive strengths, reduced shrinkage, and accelerated hydration. Other benefits include: conservation of fresh water sources, reduced loading on wastewater treatment facilities, and eliminating the costs associated with wastewater treatments. The elemental and mineral constituents contained in the landfill leachate that would normally be removed in treatment are put to beneficial use and bound up within the hardened concrete matrix.

In one aspect, the invention provides a composition capable of setting to produce a building material. The composition can include from 1% to 55% by weight of a pozzolan, from 1% to 30% by weight of an activator, from 40% to 90% by weight of an aggregate, and liquid landfill leachate in a sufficient amount such that the composition sets to a building material having a compressive strength of at least 2.0 MPa, wherein all weight percentages are percent by weight of the total composition. The liquid landfill leachate can be recovered after a liquid (typically water) percolates through a landfill and contacts in the landfill at least one coal combustion product selected from fly ash, bottom ash, boiler slag, and flue gas desulfurization material such as gypsum. In one version of the invention, liquid landfill leachate is directed from a landfill leachate collection system to a "green" brick making facility, ready mixed concrete producers, or to other concrete product manufacturers. This leachate reuse and water conservation system provides a "green" building material ingredient.

In another aspect, the invention provides a method for increasing the compressive strength of a concrete. In the method, a mixture including from 1% to 30% by weight of Portland cement, from 1% to 30% by weight of a pozzolan, and from 40% to 90% by weight of an aggregate is prepared; and liquid landfill leachate is added to the mixture in a sufficient amount such that the composition sets to a concrete having a compressive strength of at least 8.3 MPa (1200 psi), wherein all weight percentages are percent by weight of the total composition.

In still another aspect, the invention provides a method for reducing the shrinkage of a concrete. In the method, a mixture including from 1% to 30% by weight of Portland cement, from 1% to 30% by weight of a pozzolan, and from 40% to 90% by weight of an aggregate is prepared; and liquid landfill leachate is added to the mixture in a sufficient amount such that the composition sets to a concrete having a compressive strength of at least 8.3 MPa (1200 psi), wherein all weight percentages are percent by weight of the total composition.

In yet another aspect, the invention provides a method for accelerating the hydration of cement in a concrete. In the method, a mixture including from 1% to 30% by weight of Portland cement, from 1% to 30% by weight of a pozzolan, and from 40% to 90% by weight of an aggregate is prepared; and liquid landfill leachate is added to the mixture in a sufficient amount such that the composition sets to a concrete having a compressive strength of at least 8.3 MPa (1200 psi), wherein all weight percentages are percent by weight of the total composition.

In still another aspect, the invention provides a method for manufacturing a concrete product. In the method, a mixture including from 1% to 30% by weight of Portland cement, from 1% to 30% by weight of a pozzolan, and from 40% to 90% by weight of an aggregate is prepared; and liquid landfill leachate is added to the mixture in a sufficient amount such that the composition sets to a concrete product having a compressive strength of at least 8.3 MPa (1200 psi), wherein all weight percentages are percent by weight of the total composition. The liquid landfill leachate can be obtained from a leachate collection system of a landfill including at least one coal combustion product selected from fly ash, bottom ash, boiler slag, and flue gas desulfurization material, and thereafter the liquid landfill leachate can be added to the mixture.

Thus, it is an advantage of the present invention to provide an economically advantageous means for beneficial utilization of landfill leachate. It is a further advantage to provide a method for preparing a building material in which conservation of fresh water sources is achieved. It is another advantage to provide a method for increasing the compressive strength of a concrete. It is still another advantage to provide a method for reducing the shrinkage of a concrete. It is yet another advantage to provide a method for accelerating the hydration of cement in a concrete.

These and other features, aspects, and advantages of the present invention will become better understood upon consideration of the following detailed description and appended claims.

DETAILED DESCRIPTION OF THE INVENTION

A building material in accordance with the present invention can be formed from a composition including a pozzolan, an activator, aggregate, and landfill leachate. While one example embodiment of the invention produces a concrete, the invention provides for the formation of other building materials having a compressive strength suitable for various construction applications.

As is well known in the art, conventional concrete is a dense hard hydrated mass produced from mixtures of Portland cement, supplementary cementitious materials, coarse aggregate, fine aggregate, and water. Concrete mixtures generally use only sufficient water to make the mixture workable for placement and to yield hardened concrete having a compressive strength of at least 8.3 MPa (1200 psi) after 28 days. Portland cement is a well known cement that upon mixing with water binds or unites the other materials present in the mixture into concrete. The Portland cement is typically a Type I, II, III, IV and V Portland cement as defined in ASTM C 150. The coarse aggregate conventionally comprises particles such as gravel, quartzite, granite, limestone, shale, and other minerals having a particle size greater than 9.5 millimeters (0.375 inches). The fine aggregate employed in Portland cement concretes is most often sand (same as coarse aggregate geology) comprised of particles less than about 0.375 inches (9.5 millimeters) in size, typically equal to or less than about 0.1875 inches (4.76 millimeters) in size.

Typically, fresh concrete has mixing water exceeding the amount needed for hydration for purposes of workability, handling, and finishing. Sulfate in small prescribed amounts can yield a shrinkage compensating effect, and actually reduce shrinkage cracking in cement. In fact, specialty Type K cements are produced specifically to yield this effect.

A concrete may also be formed from a composition including a pozzolan. A pozzolan is a siliceous or aluminosiliceous material, which independently has few/fewer cementitious properties, but in the presence of an activator such as a lime-rich medium like calcium hydroxide, shows better cementitious properties. Non-limiting examples of pozzolans include fly ash, silica fume, metakaolin, ground granulated blast furnace slag, and mixtures thereof.

Various activators are suitable for activating the pozzolan in a composition according to the invention. For example, the activator can be selected from alkali metal carbonates, alkali metal silicates, alkali metal hydroxides, alkali metal oxides, alkali metal fluorides, alkali metal sulfates, alkali metal carboxylates, alkali metal nitrates, alkali metal nitrites, alkali metal phosphates, alkali metal sulfites, alkali metal halides, alkaline earth metal carbonates, alkaline earth metal silicates, alkaline earth metal hydroxides, alkaline earth metal oxides, alkaline earth metal fluorides, alkaline earth metal sulfates, alkaline earth metal carboxylates, alkaline earth metal nitrates, alkaline earth metal nitrites, alkaline earth metal phosphates, alkaline earth metal sulfites, alkaline earth metal halides, and mixtures thereof. Example alkali metals include sodium, potassium and lithium, and example alkaline earth metals include magnesium and calcium. The activator can also be selected from calcium oxide, calcium hydroxide, calcium silicate, and calcium carbonate. The activator can also be Portland cement or cement kiln dust. The activator can also be an organic acid such as citric acid.

One example embodiment of the invention is a composition capable of setting to produce a building material wherein the composition includes from 1% to 55% by weight of a pozzolan, from 1% to 30% by weight of an activator, from 40% to 90% by weight of an aggregate, and liquid landfill leachate in a sufficient amount such that the composition sets to a building material having a compressive strength of at least 2.0 MPa (290 psi) after 28 days, wherein all weight percentages are percent by weight of the total composition. Preferably, the composition sets to a building material having a compressive strength of at least 4 MPa (580 psi) after 28 days. More preferably, the composition sets to a building material having a compressive strength of at least 6 MPa (870 psi) after 28 days. More preferably, the composition sets to a building material having a compressive strength of at least 8.3 MPa (1200 psi) after 28 days. More preferably, the composition sets to a building material having a compressive strength of at least 13.8 MPa (2000 psi) after 28 days. The amount of pozzolan, activator, aggregate, and landfill leachate can be varied in the above weight percentages depending on the physical properties desired in the building material.

Other levels of the pozzolan can be used in this example composition according to the invention. For example, the composition preferably includes 5% to 45% by weight of pozzolan, more preferably includes 10% to 45% by weight of pozzolan, more preferably includes 15% to 45% by weight of pozzolan, more preferably includes 25% to 45% by weight of pozzolan, and even more preferably includes 35% to 45% by weight of pozzolan.

Other levels of activator can be used in a composition according to the invention. For example, the composition preferably includes from 2% to 20% by weight of activator, more preferably includes 5% to 15% by weight of activator, and even more preferably includes 6% to 10% by weight of activator.

In this version of the present invention, liquid landfill leachate replaces all or part of the tap water in a composition capable of setting to produce a building material. The composition preferably includes from 1% to 20% by weight of the liquid landfill leachate, more preferably includes 2% to 13% by weight of the liquid landfill leachate, and even more preferably includes 5% to 10% by weight of the liquid landfill leachate.

Another example embodiment of the invention is a composition capable of setting to produce a concrete wherein the composition includes from 1% to 30% by weight of Portland cement; from 1% to 30% by weight of a pozzolan; from 40% to 90% by weight of an aggregate; and liquid landfill leachate in a sufficient amount such that the composition sets to a concrete having a compressive strength of at least 8.3 MPa (1200 psi) after 28 days, wherein all weight percentages are percent by weight of the total composition. Preferably, the composition sets to a concrete having a compressive strength of at least 13.8 MPa (2000 psi) after 28 days. The amount of Portland cement, pozzolan, aggregate, and landfill leachate can be varied in the above weight percentages depending on the physical properties desired in the concrete. Likewise, the composition of the Portland cement, pozzolan, aggregate, and landfill leachate can be varied depending on the physical properties desired in the concrete.

Other levels of Portland cement can be used in a composition according to the invention. For example, the composition preferably includes from 2% to 20% by weight of Portland cement, more preferably includes 5% to 15% by weight of Portland cement, and even more preferably includes 6% to 10% by weight of Portland cement.

Other levels of the pozzolan can be used in a composition according to the invention. For example, the composition preferably includes 2% to 20% by weight of pozzolan, more preferably includes 5% to 15% by weight of pozzolan, and even more preferably includes 6% to 10% by weight of pozzolan. The preferred pozzolan is fly ash. Preferably, the fly ash meets the requirements of the ASTM Standard Specification C 618 for Class C or Class F; however, fly ashes having a carbon content as measured by loss on ignition of greater than 12% can also be suitable.

The compressive strength of a concrete in accordance with the present invention can be controlled by varying the weight ratio of Portland cement to pozzolan (e.g., fly ash) in the settable composition. Suitable weight ratios of Portland cement to pozzolan include at least 1:11, at least 1:9, at least 1:7, at least 1:5, at least 1:3, at least 1:2, at least 1:1, and at least 2:1 Portland cement to pozzolan.

In the present invention, liquid landfill leachate replaces all or part of the tap water in a composition capable of setting to produce a concrete. The composition preferably includes from 1% to 20% by weight of the liquid landfill leachate, more preferably includes 2% to 13% by weight of the liquid landfill leachate, and even more preferably includes 5% to 10% by weight of the liquid landfill leachate. In one version of the invention, the liquid landfill leachate is recovered from a landfill including at least one coal combustion product selected from fly ash, bottom ash, boiler slag, and flue gas desulfurization material. Preferably, the liquid landfill leachate is recovered from a landfill that includes only coal combustion products selected from fly ash, bottom ash, boiler slag, and flue gas desulfurization material. The liquid landfill leachate has a pH of 8 minimum, and preferably has a pH of 8-11. In one embodiment, the liquid landfill leachate has a minimum conductivity of 1000 micromhos. The liquid landfill leachate can have a conductivity of from 1000 to 100,000 micromhos. Preferably, the liquid landfill leachate includes water and is essentially free of hydrocarbons.

The liquid landfill leachate can include water and one or more of the following: (i) boron, (ii) calcium, (iii) iron, (iv) magnesium, (v) sulfate, (vi) chloride, (vii) sodium, (viii) potassium, (ix) aluminum, and (x) silica. These materials may be dissolved or dispersed in the liquid landfill leachate.

In one embodiment, the liquid landfill leachate can include water and one or more of the following: (i) boron at a concentration of 5 mg/L minimum, (ii) calcium at a concentration of 50 mg/L minimum, (iii) iron at a concentration of 0.1 mg/L minimum, (iv) magnesium at a concentration of 15 mg/L minimum, (v) sulfate at a concentration of 100 mg/L minimum, (vi) sodium at a concentration of 20 mg/L minimum, and (vii) potassium at a concentration of 5 mg/L minimum, all concentrations being based on the amount of liquid landfill leachate.

In another embodiment, the liquid landfill leachate includes water and one or more of the following: (i) boron at a concentration of 5 to 1000 mg/L, (ii) calcium at a concentration of 50 to 10,000 mg/L, (iii) iron at a concentration of 0.1 to 100 mg/L, (iv) magnesium at a concentration of 15 to 1000 mg/L, (v) sulfate at a concentration of 100 to 50,000 mg/L, (vi) sodium at a concentration of 20 to 10,000 mg/L, and (vii) potassium at a concentration of 5 to 1,000 mg/L, all concentrations being based on the amount of liquid landfill leachate.

In yet another embodiment, the liquid landfill leachate includes water and one or more of the following: (i) boron at a concentration of 20 to 300 mg/L, (ii) calcium at a concentration of 50 to 1,000 mg/L, (iii) iron at a concentration of 0.1 to 60 mg/L, (iv) magnesium at a concentration of 30 to 200 mg/L, (v) sulfate at a concentration of 500 to 40,000 mg/L, (vi) sodium at a concentration of 20 to 10,000 mg/L, and (vii) potassium at a concentration of 5 to 1,000 mg/L, all concentrations being based on the amount of liquid landfill leachate.

The aggregate can be selected such that the composition comprises from 20% to 50% by weight of a fine aggregate having particles of a size of 9.5 millimeters or less, and from 30% to 55% by weight of a coarse aggregate having a majority of particles of a size greater than 9.5 millimeters. Preferably, the aggregate is selected such that the composition comprises from 30% to 40% by weight of a fine aggregate having particles of a size of 9.5 millimeters or less, and from 35% to 45% by weight of a coarse aggregate having a majority of particles of a size greater than 9.5 millimeters. Most preferably, the coarse aggregate has particles of a size less than 25 millimeters. Sand is one preferred example of a fine aggregate, and crushed stone is one preferred example of a coarse aggregate.

Optionally, an air-entraining admixture is included in the composition in order to provide air-entrainment of 5% or higher. The composition preferably includes from 0.01% to 1% by weight of an air-entraining admixture, and more preferably includes from 0.01% to 0.1% by weight of an air-entraining admixture.

One specific embodiment of the invention is a composition capable of setting to produce a concrete wherein the composition consists essentially of from 5% to 15% by weight of Portland cement; from 5% to 15% by weight of fly ash; from 30% to 40% by weight of sand; from 35% to 45% by weight of crushed stone; from 2% to 13% by weight of liquid landfill leachate; and optionally from 0.01% to 0.1% by weight of an air-entraining admixture.

The invention also provides a method for making a masonry unit such as a brick or a concrete block. The masonry unit can be a solid unit, a perforated unit, a hollow unit, or a cellular unit. In the method, a settable composition is prepared by mixing a pozzolan, an activator, an aggregate, and liquid landfill leachate. Suitable pozzolans and activators are noted above. The settable composition is molded, and the composition is allowed to set to form the masonry unit. The composition can be molded by, for example, press molding, extrusion, casting, or compaction molding. Preferably, the liquid landfill leachate is included in a sufficient amount in the composition such that the masonry unit has a compressive strength of at least 2.0 MPa (290 psi) at 28 days after the composition is molded. More preferably, the compressive strength of the masonry unit is at least 4.0 MPa (580 psi) at 28 days. More preferably, the compressive strength of the masonry unit is at least 6.0 MPa (870 psi) at 28 days. More preferably, the compressive strength of the masonry unit is at least 8.3 MPa (1200 psi) at 28 days. More preferably, the compressive strength of the masonry unit is at least 13.8 MPa (2000 psi) at 28 days.

In the method for making a masonry unit, the settable composition can include from 1% to 55% by weight of the pozzolan, from 1% to 30% by weight of the activator, and from 40% to 90% by weight of the aggregate, wherein all weight percentages are percent by weight of the total composition. Preferably, the pozzolan is fly ash, and the aggregate is sand. Preferably, the liquid landfill leachate is recovered from a landfill including at least one coal combustion product selected from fly ash, bottom ash, boiler slag, and flue gas desulfurization material.

In the method for making a masonry unit, other levels of the pozzolan can be used. For example, the settable composition preferably includes 5% to 45% by weight of pozzolan, more preferably includes 10% to 45% by weight of pozzolan, more preferably includes 15% to 45% by weight of pozzolan, more preferably includes 25% to 45% by weight of pozzolan, and even more preferably includes 35% to 45% by weight of pozzolan.

In the method for making a masonry unit, other levels of the activator can be used. For example, the settable composition preferably includes from 2% to 20% by weight of activator, more preferably includes 5% to 15% by weight of activator, and even more preferably includes 6% to 10% by weight of activator.

In the method for making a masonry unit, other levels of the liquid leachate can be used. For example, liquid landfill leachate replaces all or part of the tap water in a composition capable of setting to produce a masonry unit. The composition preferably includes from 1% to 20% by weight of the liquid landfill leachate, more preferably includes 2% to 13% by weight of the liquid landfill leachate, and even more preferably includes 5% to 10% by weight of the liquid landfill leachate.

The invention is further illustrated in the following Examples which are presented for purposes of illustration and not of limitation. Landfill leachate was successfully used to produce a concrete building material.

EXAMPLES

Materials Used in the Examples

Type I Portland cement with a specific gravity of 3.15 and a Blaine fineness of 380 $m^2$/kg was used. The Portland cement complied with ASTM C 150-07.

Fly ash having the following analysis was used: $SiO_2$ (silicon dioxide)=39.75%; $Al_2O_3$ (aluminum oxide)=21.14%; $Fe_2O_3$ (iron oxide)=5.41%; $SiO_2$+$Al_2O_3$+$Fe_2O_3$=66.3%; CaO (calcium oxide)=20.60%; MgO (magnesium oxide)=4.27%; $SO_3$ (sulfur trioxide)=1.95%; Moisture content=0.04%; Loss On Ignition=0.69%; $Na_2O$ (sodium oxide)= 1.65%; $K_2O$ (potassium oxide)=0.68%; Fineness amount retained on #325 sieve=15.9%; Density=2.55 $Mg/m^3$; and spherical particles of an average size of approximately 10 μm. The fly ash conformed to ASTM C 618-05 Class C.

The coarse aggregate used was a 25 millimeters (about 1") maximum-size crushed quartzite with a specific gravity of 2.65 and water absorption of 0.15%.

The fine aggregate used was a local natural sand with a fineness modulus of 2.71, a specific gravity of 2.65, and a water absorption of 0.5%.

An air-entraining admixture was used. The air-entraining admixture was MB-AE 90 supplied by BASF in order to provide air-entrainment of 5% or higher. The recommended dosage of the air-entraining admixture is ¼ to 4 fl oz/cwt (16-260 mL/100 kg) of cementitious material.

Tap water from the Milwaukee Water Works, Milwaukee, Wis., USA was used. Based on a 2008 Annual Water Quality Report, this tap water has (among other things) a pH of 7.80 maximum, a conductivity of 335 micromhos maximum, boron at a concentration of 0.022 mg/L maximum, calcium at a concentration of 38.0 mg/L maximum, iron at a concentration of 0.076 mg/L maximum, magnesium at a concentration of 13 mg/L maximum, potassium at a concentration of 1.6 mg/L maximum, sodium at a concentration of 13.01 mg/L maximum, and sulfate at a concentration of 27.0 mg/L maximum.

Landfill leachate from a landfill having coal combustion products such as fly ash and bottom ash was used. The landfill leachate had a pH of 10.1, a conductivity of 21,100 micromhos, boron at a concentration of 53 mg/L, calcium at a concentration of 220 mg/L, iron at a concentration of 0.035 mg/L, magnesium at a concentration of 72 mg/L, potassium at a concentration of 80 mg/L, sodium at a concentration of 5,300 mg/L, and sulfate at a concentration of 11,000 mg/L. Over an eight year span, this landfill leachate had readings in the following range: pH of 8.5-10.1, boron at a concentration of 40-200 mg/L, calcium at a concentration of 86-470 mg/L, iron at a concentration of 0.018-46 mg/L, magnesium at a concentration of 45-150 mg/L, and sulfate at a concentration of 7200-32500 mg/L.

Another alternative landfill leachate from a landfill having coal combustion products such as fly ash and bottom ash was obtained but not used in the Examples. However, this landfill leachate would also be acceptable for use in the concrete mixtures. The alternative landfill leachate had a pH of 9.7, a conductivity of 2160 micromhos, boron at a concentration of 21.8 mg/L, calcium at a concentration of 180 mg/L, iron at a concentration of 0.023 mg/L, magnesium at a concentration of 13.2 mg/L, potassium at a concentration of 48 mg/L, sodium at a concentration of 240 mg/L, and sulfate at a concentration of 920 mg/L. Over a five year span, this landfill leachate had readings in the following range: calcium at a concentration of 150-220 mg/L, and sulfate at a concentration of 920-1430 mg/L.

Mixture Proportions Used in the Examples

Four concrete mixtures were tested. These included two reference mixtures based on tap water and fly ash, designated as RFA below and a tap water and fly ash-Portland cement blend (56:44), designated as RBC below. These concretes (RFA/RBC) were compared with concretes of similar composition based on landfill leachate in place of tap water (designated as WFA/WBC). The specified concrete mixture proportions (in lb per $yd^3$) were as follows in Table 1:

TABLE 1

| | Case 1 (RFA/WFA) | Case 2 (RBC/WBC) |
|---|---|---|
| Class C Fly Ash | 700 | 382 |
| Portland Cement | | 305 |
| Water* (approximately) | 270 | 270 |
| ¾" Coarse Aggregate | 1810 | 1810 |
| Sand | 1450 | 1450 |
| w/cementitious ratio (estimate) | 0.40 | 0.40 |

*for a 4-5" slump

Normally, the application of at least three aggregate types is recommended to meet the requirements for optimal aggregate proportioning. With the aggregates used, the 55:45 coarse aggregates—fine aggregates (sand) mix provides the best particle size distribution that matches the optimal 0.45 power curve (as shown in Table 2). The concrete mixtures were designed for relatively low w/c of 0.44 and a water content of 275-290 lb/$yd^3$. The water content was adjusted to provide a slump of 5.5±2.5 inches. The content of the air entraining admixture was adjusted to provide air content of 5.5-6.5%. The trial batches resulted in the yield of 1.11, 1.06, 1.06, 1.10 for mixtures RFA, RBC, WFA, WBC, respectively. The resulting (corrected for the yield) concrete mixture proportioning per $yd^3$ is presented in Table 3.

TABLE 2

Particle Size Distribution of Aggregates

| Sieve Size | | Aggregates Passing, % | | | |
|---|---|---|---|---|---|
| No./in | mm | Coarse | Sand | Mix | 0.45 power mix |
| 1.5 | 37.5 | 100.0 | — | 100.0 | 100.0 |
| 1 | 25 | 100.0 | — | 100.0 | 100.0 |
| 0.75 | 19 | 98.0 | — | 98.9 | 88.4 |
| 0.50 | 12.5 | 49.0 | — | 71.7 | 73.2 |
| 0.38 | 9.5 | 29.4 | 100.0 | 60.8 | 64.7 |
| No. 4 | 4.75 | 2.0 | 99.8 | 45.5 | 47.4 |
| No. 8 | 2.36 | — | 87.8 | 39.1 | 34.6 |
| No. 16 | 1.18 | — | 71.6 | 31.9 | 25.3 |
| No. 30 | 0.6 | — | 51.4 | 22.9 | 18.7 |
| No. 50 | 0.425 | — | 14.8 | 6.6 | 16.0 |
| No. 100 | 0.15 | — | 3.9 | 1.7 | 10.0 |
| No. 200 | 0.075 | — | 1.6 | 0.7 | 7.3 |

TABLE 3

Concrete Mixture Proportions

| | | Mixture Type | | | |
|---|---|---|---|---|---|
| Composition | Units | RFA | RBC | WFA | WBC |
| Cement | lb/$yd^3$ | — | 286 | — | 276 |
| Fly Ash | lb/$yd^3$ | 628 | 359 | 658 | 346 |
| Tap Water | lb/$yd^3$ | 278 | 286 | — | — |
| Landfill leachate | lb/$yd^3$ | — | — | 291 | 275 |
| Coarse Aggregates | lb/$yd^3$ | 1625 | 1700 | 1702 | 1639 |
| Sand | lb/$yd^3$ | 1302 | 1363 | 1364 | 1314 |
| Air-Entraining admixture | gal/$yd^3$ | 0.22 | 0.11 | 0.23 | 0.11 |

TABLE 4

Fresh Properties, Compressive Strength and Shrinkage of Investigated Concretes

| | | | Mixture Type | | | |
|---|---|---|---|---|---|---|
| | Properties | Units | RFA | RBC | WFA | WBC |
| Fresh | Density (Unit Weight) | lb/$ft^3$ | 148 | 154 | 155 | 149 |
| | Density (Unit Weight) | lb/$yd^3$ | 3837 | 3994 | 4018 | 3851 |
| | Air Content | % | 5.5 | 5.5 | 5.8 | 6.5 |
| | Slump (after 5 min) | in | 8.0 | 5.5 | 8.0 | 6.0 |
| | Slump (after 15 min) | in | 4.5 | 3.5 | 3.0 | 5.0 |
| | Initial Setting | hour:min | 0:30 | 16:40 | 0:50 | 11:50 |
| | Final Setting* | hour:min | 1:10* | 24:55 | 1:40* | 15:50 |
| Hardened | Compressive Strength, at age of | | | | | |
| | 1 days | psi | 319 | 164 | 180 | 522 |
| | 3 days | psi | 598 | 1,484 | 195 | 2,601 |
| | 7 days | psi | 940 | 3,118 | 248 | 3,445 |
| | 14 days | psi | 1,148 | 4,053 | 280 | 4,357 |
| | 28 days | psi | 1,242 | 4,816 | 394 | 5,627 |
| | 56 days | psi | 1,532 | 5,897 | 434 | 6,310 |
| | 91 days | psi | 1,567 | 7,084 | 437 | 6,991 |
| | Deformation Strain,** at the age of | | | | | |
| | 14 days | in/in × $10^{-6}$ | 17 | 55 | −27 | 39 |
| | 28 days | in/in × $10^{-6}$ | 11 | 27 | −7 | 15 |
| | 56 days | in/in × $10^{-6}$ | −141 | −300 | −105 | −264 |
| | 91 days | in/in × $10^{-6}$ | −211 | −323 | −95 | −300 |

*Final setting was not detectable for #1 and #3; reported values were obtained by extrapolation of experimental data

**Positive sign corresponds to expansion (swelling) and negative to shrinkage; exposure conditions: until the age of 28 days curing at 73° F. and 95% RH; afterwards, environmental exposure at 73° F. and 50% RH Casting and Curing of Test Specimens All the concrete mixtures were mixed for 5 minutes in a laboratory drum mixer. The ASTM C192 "Standard Practice of Making and Curing Concrete Test Specimens in the Laboratory" was used for the preparation of concrete specimens. Tests were conducted on fresh concrete mixtures to determine slump, temperature, air content, and unit weight (density), yield of fresh concrete, and setting times (initial and final). From each concrete mixture, 21 (three for each age tested) 100×200 mm (4"×8") cylinders were cast to determine compressive strength at the age of 1, 3, 7, 14, 28, 56 and 91 days. The specimens were cast in two layers with vibration. Linear shrinkage/expansion of concrete was investigated using 3"×3"×11" beams, using three specimens for each mix. After casting, all molded specimens were covered with plastic sheets and left in the curing room for 24 hours. They were then demolded and the specimens were returned to the moist-curing room at 73.4±3° F. (23.0±1.7° C.) and 96±1% relative humidity until they reached testing age.

Testing of Fresh Concrete

The following properties of fresh concrete were investigated: Slump according to ASTM C143 "Standard Test Method for Slump of Hydraulic-Cement Concrete;" Fresh Density (Unit Weight) according to ASTM C138 "Standard Test Method for Density (Unit Weight), Yield, and Air Content (Gravimetric) of Concrete;" Air Content according to ASTM C231 "Standard Test Method for Air Content of Freshly Mixed Concrete by the Pressure Method;" and Setting Time according to ASTM C403 "Standard Test Method for Time of Setting of Concrete Mixtures by Penetration Resistance." The results are in Table 4 above.

Testing of Mechanical Properties

The compressive strength of each concrete mixture was determined following ASTM C39 "Standard Test Method for Compressive Strength of Cylindrical Concrete Specimens" on three cylinders at 1, 3, 7, 14, 28, 56, and 91 days. The mean value of the three cylinder strengths at a particular age was reported as the compressive strength value. The results are in Table 4 above.

Testing of Shrinkage

Water content, mortar paste fraction, admixture selection, cement and pozzolan types and quantities, coupled with aggregate characteristics and mix design proportions have the most significant impact on concrete's drying shrinkage characteristics. Careful selection of these variables is critical when designing fly ash concrete. ASTM C157, "Standard Test Method for Length Change of Hardened Hydraulic-Cement Mortar and Concrete" was used to determine the length change of hardened fly ash concrete. The following equipment was used for the test: (1) Steel molds 3 in.×3 in.×11 in. (76 mm×76 mm×280 mm) with 11.2 in. (285 mm) nominal gauge length; (2) Length comparator and reference bar (ASTM C490); (3) Curing room for maintaining temperatures of 23.0±1.7° C. (73.4±3° F.) and relative humidity of 50±4%.

ASTM C157 requires moist-cabinet or moist-room curing per ASTM C511 during the initial period and at time 23±1/2 hour, specimens must be demolded and placed in the moist room maintained at 73.4±3° F. (23.0±1.7° C.) and RH>95% for a minimum of 30 minutes. At time 24±½ hour, initial comparator readings (called one-day reading) on wiped-down specimens are recorded, then returned to the moist room. ASTM C157 specifies follow-up curing in lime-saturated water tank; however, moist-room curing 73.4±3° F. (23.0±1.7° C.) that follows the curing conditions of other concrete samples until they have reached an age of 28 days is also acceptable, since all of the specimens are exposed to high (>95%) humidity levels that allow free-moisture transport into the specimens. This test-specific condition is noted. At 28 days, a final comparator reading was taken and the specimens were placed on racks in the drying room. This launched the start of air curing and subsequent shrinkage readings were taken to follow the concrete strength testing pattern at the ages of 56 and 91 days. The results are in Table 4 above.

Results and Discussion

1. Fresh Concrete Properties

The initial slump of the investigated concrete mixtures was in the range of 5.5 to 8 inches. Fly ash concretes demonstrated very quick slump loss, after 15 minutes reaching 56 and 38% of initial slump value or 4.5 and 3 inches for the RFA and WFA concretes, respectively. All investigated concrete mixtures presented the air content between 5.5% and 6.5%; however, it should be noted that to provide the above-mentioned content of air, the mixtures based on fly ash required a relatively high dosage of air-entraining admixture.

The average temperature of the concrete mixtures was 74±2° F. Fly ash concretes demonstrated very quick setting, with initial setting time of 30 and 50 minutes for the RFA and WFA concretes, respectively. Because of low strength and specimen rupture, it was impossible to determine the final setting time for these types of concrete; thus, final time values are obtained using extrapolation of the experimental data. For practical application of such concrete, the addition of retarding admixture is required to extend the setting times to acceptable levels. Specimens RBC and WBC had extended initial/final setting times, 16:40/24:55 and 11:50/15:50, which is clear sign of retarded hydration of cement. It can be noted that the application of landfill leachate (specimen WBC) allows considerable acceleration of hydration resulting in shorter setting times.

2. Mechanical Properties

The compressive strength of the investigated concrete is shown in Table 4 above. The control concrete based on fly ash developed higher compressive strengths vs. Portland cement—fly ash concrete at age of one day. Concrete based on fly ash-Portland cement blend had a higher compressive strength (vs. RFA) after three days of hardening. At the age of 91 days, such concrete had more than a four-fold increase of compressive strength vs. reference fly ash concrete. The application of landfill leachate in fly ash concrete (specimen WFA) reduced strength (vs. RFA) in all ages of hardening. However, the application of landfill leachate (specimen WBC) in concrete based on fly ash-Portland cement blend considerably improves early (seven days and less) strength and provides better strength through the 56-day age and near the same strength at the 91 day age.(6991 psi vs. 7084 psi).

3. Shrinkage Properties

The results of shrinkage tests are reported in Table 4. At the age of 91 days, the control concrete based on fly ash (RFA) demonstrated only 65% of shrinkage vs. Portland cement— fly ash concrete, 211 vs. 323 microstrain, respectively. The application of landfill leachate (specimens WFA and WBC) reduces shrinkage vs. corresponding reference concrete. For example, for concrete based on fly ash-Portland cement blend the shrinkage reached 323 and 300 microstrain, for tap water and landfill leachate specimens, respectively. Interestingly, the application of landfill leachate also resulted in reduced swelling (due to exposure to 95% RH until 28-day age). Fly ash concrete with landfill leachate (specimen WFA) had a very low drying shrinkage at the ages of 56 and 91 days (105 and 95 microstrain, respectively.

CONCLUSIONS

It can be seen from the tests above that the use of landfill leachate to produce concrete can be beneficial. The application of landfill leachate does not cause any pronounced difference in workability of investigated fly ash concrete. It can be noted that fly ash concretes demonstrated very quick setting, with initial setting time of 30 and 50 minutes, for RFA and WFA concretes, respectively. The use of landfill leachate in fly ash-Portland cement-based concrete (specimen WBC) allows considerable acceleration of hydration that results in shorter setting times vs. reference (RBC).

The conducted investigation demonstrates that the replacement of tap water with landfill leachate results in fly ash-Portland cement-based concrete with significantly enhanced strength, especially, in early ages of hardening. The observed performance improvement is a very important feature related to the application of landfill leachate, which can be effectively used in many practical construction applications (e.g., concrete for pre-cast, highways, cast-in-place).

It was demonstrated that the application of landfill leachate results in reduction of shrinkage vs. corresponding reference concrete. For concrete based on fly ash-Portland cement blend, the 91-day shrinkage reached 323 and 300 microstrain for tap water and landfill leachate specimens, respectively. The application of landfill leachate also resulted in reduced swelling, suggesting the formation of less porous microstructure, hindering shrinkage-swelling deformation of concrete.

Therefore, it can be seen that the invention provides an economically advantageous means for beneficial utilization of landfill leachate, and also a method for preparing a building material such as concrete in which conservation of fresh water sources is achieved. The methods of the invention can increase the compressive strength of a concrete, reduce the shrinkage of a concrete, and accelerate the hydration of cement in a concrete.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. A composition capable of setting to produce a building material, the composition comprising:

from 1% to 55% by weight of a pozzolan;

from 1% to 30% by weight of an activator;

from 40% to 90% by weight of an aggregate; and from 1% to 20% by weight of a liquid landfill leachate in a sufficient amount such that the composition sets to a building material having a compressive strength of at least 2.0 MPa, wherein all weight percentages are percent by weight of the total composition.

2. The composition of claim 1 wherein:

the pozzolan is selected from fly ash, silica fume, metakaolin, ground granulated blast furnace slag, and mixtures thereof.

3. The composition of claim 1 wherein:

the activator is selected from the group consisting of alkali metal carbonates, alkali metal silicates, alkali metal hydroxides, alkali metal oxides, alkali metal fluorides, alkali metal sulfates, alkali metal carboxylates, alkali metal nitrates, alkali metal nitrites, alkali metal phosphates, alkali metal sulfites, alkali metal halides, alkaline earth metal carbonates, alkaline earth metal silicates, alkaline earth metal hydroxides, alkaline earth metal oxides, alkaline earth metal fluorides, alkaline earth metal sulfates, alkaline earth metal carboxylates, alkaline earth metal nitrates, alkaline earth metal nitrites, alkaline earth metal phosphates, alkaline earth metal sulfites, alkaline earth metal halides, and mixtures thereof.

4. The composition of claim 1 wherein:

the activator is selected from the group consisting of materials including calcium oxide, calcium hydroxide, calcium silicate, and calcium carbonate.

5. The composition of claim 1 wherein:

the pozzolan is fly ash, and the activator is Portland cement.

6. The composition of claim 5 wherein:

a weight ratio of Portland cement to fly ash in the composition is at least 1:11.

7. The composition of claim 5 wherein:

the composition includes from 5% to 15% by weight of fly ash, and the composition includes from 5% to 15% by weight of Portland cement.

8. The composition of claim 5 wherein:

the aggregate is selected such that the composition comprises from 20% to 50% by weight of a fine aggregate having particles of a size of 9.5 millimeters or less, and from 30% to 55% by weight of a coarse aggregate having a majority of particles of a size greater than 9.5 millimeters.

9. The composition of claim 5 wherein:

the aggregate is selected such that the composition comprises from 30% to 40% by weight of a fine aggregate having particles of a size of 9.5 millimeters or less, and from 35% to 45% by weight of a coarse aggregate having a majority of particles of a size greater than 9.5 millimeters.

10. The composition of claim 5 wherein:

the composition further includes from 0.01% to 1% by weight of an air-entraining admixture.

11. The composition of claim 5 wherein the composition consists essentially of:

from 5% to 15% by weight of fly ash;

from 5% to 15% by weight of Portland cement;

from 30% to 40% by weight of sand;

from 35% to 45% by weight of crushed stone;

from 2% to 13% by weight of liquid landfill leachate; and optionally from 0.01% to 0.1% of an air-entraining admixture.

12. The composition of claim 5 wherein:

the composition includes liquid landfill leachate in a sufficient amount such that the composition sets to a building material having a compressive strength of at least 8.3 MPa, and the building material is concrete.

13. The composition of claim 5 wherein:

the composition includes liquid landfill leachate in a sufficient amount such that the composition sets to a building material having a compressive strength of at least 13.8 MPa, and the building material is concrete.

14. The composition of claim 1 wherein the composition includes from 2% to 13% by weight of the liquid landfill leachate.

15. The composition of claim 1 wherein the composition includes from 1% to 20% by weight of the liquid landfill leachate.

16. The composition of claim 1 wherein:

the liquid landfill leachate is recovered from a landfill including at least one coal combustion product selected from fly ash, bottom ash, boiler slag, and flue gas desulfurization material.

17. The composition of claim 1 wherein:

the liquid landfill leachate has a pH of 8-11.

18. The composition of claim 1 wherein:

the liquid landfill leachate has a minimum conductivity of 1000 micromhos.

19. The composition of claim 1 wherein:

the liquid landfill leachate includes water and is essentially free of hydrocarbons.

20. The composition of claim 1 wherein:

the liquid landfill leachate includes water and one or more of the following: (i) boron at a concentration of 5 mg/L minimum, (ii) calcium at a concentration of 50 mg/L minimum, (iii) iron at a concentration of 0.1 mg/L minimum, (iv) magnesium at a concentration of 15 mg/L minimum, (v) sulfate at a concentration of 100 mg/L minimum, (vi) sodium at a concentration of 20 mg/L minimum, and (vii) potassium at a concentration of 5 mg/L minimum, all concentrations being based on the amount of liquid landfill leachate.

21. The composition of claim 1 wherein:

the liquid landfill leachate includes water and one or more of the following: (i) boron at a concentration of 5 to 1000 mg/L, (ii) calcium at a concentration of 50 to 10,000 mg/L, (iii) iron at a concentration of 0.1 to 100 mg/L, (iv) magnesium at a concentration of 15 to 1000 mg/L, (v) sulfate at a concentration of 100 to 50,000 mg/L, (vi) sodium at a concentration of 20 to 10,000 mg/L, and (vii) potassium at a concentration of 5 to 1,000 mg/L, all concentrations being based on the amount of liquid landfill leachate.

22. The composition of claim 1, wherein the composition includes from 2% to 13% by weight of the liquid landfill leachate.

23. A method for making a masonry unit, the method comprising:

preparing a settable composition comprising from 1% to 55% by weight of a pozzolan, from 1% to 30% by weight of an activator, from 40% to 90% by weight of an aggregate, and from 1% to 20% by weight of a liquid landfill leachate in a sufficient amount such that the composition sets to a building material having a compressive strength of at least 2.0 MPa, wherein all weight percentages are percent by weight of the total composition;

molding the settable composition; and allowing the composition to set to form the masonry unit.

24. The method of claim 23 wherein:

the pozzolan is fly ash.

25. The method of claim 23 wherein:

the liquid landfill leachate is included in a sufficient amount in the composition such that the masonry unit has a compressive strength of at least 8.3 MPa after the composition sets.

26. The method of claim 23 wherein:

the liquid landfill leachate is recovered from a landfill including at least one coal combustion product selected from fly ash, bottom ash, boiler slag, and flue gas desulfurization material.

27. A method for manufacturing a concrete product, the method comprising: preparing a composition comprising from 1% to 55% by weight of a pozzolan, from 1% to 30% by weight of an activator, from 40% to 90% by weight of an aggregate; and from 1% to 20% by weight of a liquid landfill leachate in a sufficient amount such that the composition sets to a concrete product having a compressive strength of at least 8.3 MPa, wherein all weight percentages are percent by weight of the total composition.

28. The method of claim 27 wherein:

the liquid landfill leachate is obtained from a leachate collection system of a landfill including at least one coal combustion product selected from fly ash, bottom ash, boiler slag, and flue gas desulfurization material.

* * * * *